No. 83,442. W. W. BABCOCK. CAR BRAKE. PATENTED OCT. 27, 1868.
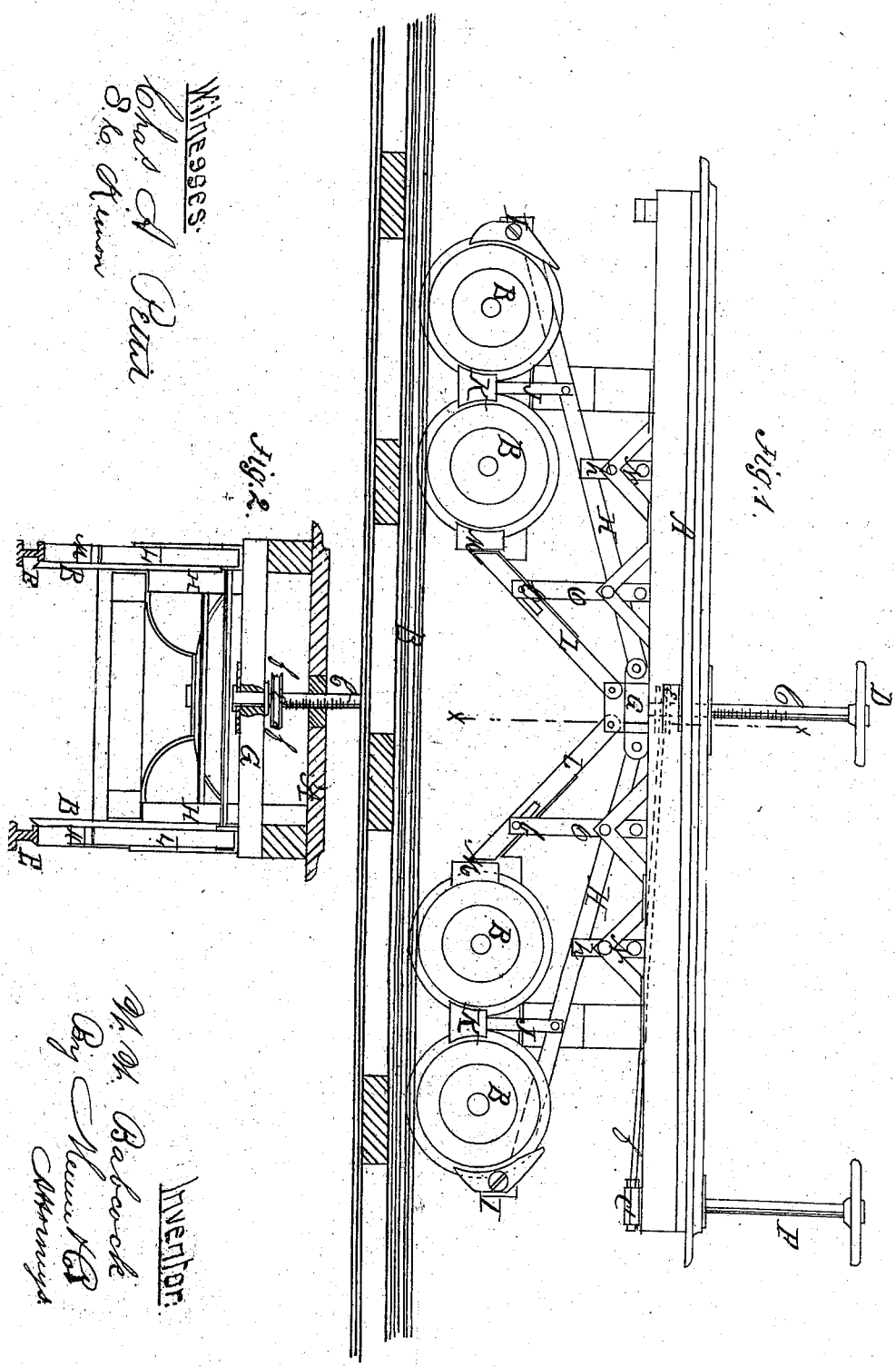

WILLIAM W. BABCOCK, OF HARMAR, ASSIGNOR TO HIMSELF, A. W. McCORMICK, AND SAMUEL S. McNAUGHTON, OF MARIETTA, OHIO.

Letters Patent No. 83,442, dated October 27, 1868.

IMPROVED CAR-BRAKE.

The Schedule referred to in these Letters Patent and making part of the same.

*To all whom it may concern:*

Be it known that I, WILLIAM W. BABCOCK, of Harmar, in the county of Washington, and State of Ohio, have invented a new and improved Car-Brake; and I do hereby declare that the following is a full, clear, and exact description of the construction and operation of the same, reference being had to the accompanying drawings, making a part of this specification, in which—

Figure 1 is a side elevation.

Figure 2 is a vertical cross-section, through the line x x of fig. 1.

This invention has for its object to furnish a more simple and powerful car-brake than any hitherto employed, and, to this end, consists in a peculiar combination of the screw with a toggle-joint lever, whereby the brakes can be, at any time, applied by a child with so great force as to instantly stop the wheels.

In the drawings, A indicates the body of the car, B B the wheels, and E E the rails.

The power is applied by a screw-spindle, C, either directly, by turning the hand-wheel D, or through the medium of a belt, f, pulleys e e', and hand-wheel and spindle F, in some more convenient portion of the car.

The spindle C screws up and down through a socket or female screw in the car-body, prepared for the purpose, and, as it rises and descends, forces up or down a cross-bar, G, which is attached to the lower end of it, under the car.

A long lever, H, pivoted at h, is hinged to the cross-bar G, at its inner end, and, at its outer end, bears against the curved upper end of a brake-head, I, pivoted at i, and having its lower end operating against the wheel.

As the bar G is raised by the screw, its outer end is lowered, releasing the brake-head from the wheel, and, as the bar is depressed, the outer end of the lever is forced up against the curved upper arm of the brake-head, forcing it outward, and thereby forcing the lower arm against the face of the wheel with great power.

Just outside of the pivot h, an arm, J, is hinged to the lever H, and extends down between the two wheels, on one end of the truck, where it supports a wedge-formed brake-head, K, that operates upon both wheels, in a manner that will be at once understood from the drawings, and with a power equal to the force applied at the wheel D, multiplied by the screw, lever, and wedge, combined.

Hinged to the bar G is another lever, L, pivoted at l, and supporting a brake-head, M, at its lower end, which it applies directly to the tread of the wheel when the cross-bar G is depressed.

The standards N O, to which the levers H L are pivoted, being firmly fixed to the under side of the car-body, it is necessary that the levers themselves should have a slight longitudinal play, to accommodate them to the movement of the bar G. I accordingly make a short slot transversely through each of said levers, and pass the pivot-pin or bolt through such slot. Each lever thus can slide slightly upon its pivot, in addition to its movement upon the latter as a fulcrum, a feature which gives the levers additional power, causing them to act, in some degree, as "toggle-joint" levers.

The wheels are thus clamped on both sides, and with such immense power that but little force is necessary to be applied at the brake-spindles.

The whole apparatus is simple and inexpensive, and can be applied to any kind of car or car-wheel.

Having thus described my invention,

What I claim as new, and desire to secure by Letters Patent, is—

1. The combination of the screw-spindle C, cross-bar G, lever H, and brake-head I, when said parts are constructed to operate substantially as described.

2. The combination of the screw-spindle C, cross-bar G, lever H, arm J, and wedge-shaped brake-head K, when constructed to operate in the manner set forth.

3. The arrangement of the brake-heads I K M, wheels B B, levers H L, cross-bar G, and screw-spindle C, as described and shown.

To the above specification of my improvement, I have signed my hand, this          day of          1867.

WM. W. BABCOCK.

Witnesses:
    WILL. S. BOWMAN,
    R. E. BOWMAN.